United States Patent
Bush et al.

(10) Patent No.: US 12,161,592 B2
(45) Date of Patent: Dec. 10, 2024

(54) ARTICULATING CHAIR

(71) Applicant: Board of Trustees of Michigan State University, East Lansing, MI (US)

(72) Inventors: Tamara Reid Bush, Pinckney, MI (US); Justin Scott, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 18/752,877

(22) Filed: Jun. 25, 2024

(65) Prior Publication Data

US 2024/0342025 A1 Oct. 17, 2024

Related U.S. Application Data

(63) Continuation of application No. PCT/US2023/013504, filed on Feb. 21, 2023.

(Continued)

(51) Int. Cl.
*A61G 5/10* (2006.01)
*A47C 1/024* (2006.01)

(Continued)

(52) U.S. Cl.
CPC .......... *A61G 5/1056* (2013.01); *A47C 1/0242* (2013.01); *A47C 7/144* (2018.08); *A47C 7/285* (2013.01); *A47C 7/462* (2013.01); *A61G 5/122* (2016.11); *A61G 5/124* (2016.11); *B60N 2/6673* (2015.04); *A61G 5/1072* (2013.01)

(58) Field of Classification Search
None
See application file for complete search history.

(56) References Cited

U.S. PATENT DOCUMENTS

| 3,964,786 A | 6/1976 | Mashuda | |
|---|---|---|---|
| 5,050,930 A * | 9/1991 | Schuster | B60N 2/666 297/284.4 |

(Continued)

FOREIGN PATENT DOCUMENTS

DE 212020000232 U1 * 12/2020 ............. A47C 7/462

OTHER PUBLICATIONS

International Search Report and Written Opinion mailed Jun. 26, 2023, in corresponding International Application No. PCT/US23/13504.

(Continued)

*Primary Examiner* — David E Allred
(74) *Attorney, Agent, or Firm* — Harness, Dickey & Pierce PLC

(57) ABSTRACT

An articulating chair and a method of using same, include at least one actuator, a programmable controller, and movable upper back, lower back and seat bottom sections. In another aspect, an articulating wheelchair and a method of using same, include a seat bottom section, a lower frame to which the seat bottom section is coupled, floor-contacting wheels rotatably coupled to the lower frame, an upper back section, a lower back section, a back frame to which the upper back section and the lower back section are movably coupled, electromagnetic actuators coupled to the back sections, a battery mounted to at least one of the frames, and a programmable controller connected to the actuators and the battery.

30 Claims, 14 Drawing Sheets

Related U.S. Application Data

(60) Provisional application No. 63/314,611, filed on Feb. 28, 2022.

(51) Int. Cl.
  *A47C 7/14* (2006.01)
  *A47C 7/28* (2006.01)
  *A47C 7/46* (2006.01)
  *A61G 5/12* (2006.01)
  *B60N 2/66* (2006.01)

(56) References Cited

U.S. PATENT DOCUMENTS

| | | | | |
|---|---|---|---|---|
| 5,120,109 | A * | 6/1992 | Rangoni | B60N 2/2222 297/284.3 |
| 6,257,664 | B1 | 7/2001 | Chew et al. | |
| 6,276,704 | B1 * | 8/2001 | Suiter | A61G 5/1054 180/907 |
| 6,530,622 | B1 * | 3/2003 | Ekern | B60N 2/2222 297/354.11 |
| 6,655,731 | B2 * | 12/2003 | Martin | A47C 7/48 297/23 |
| 6,974,188 | B2 * | 12/2005 | Turner | A47C 7/445 297/285 |
| 7,246,856 | B2 | 7/2007 | Kruse et al. | |
| 8,726,908 | B2 | 5/2014 | Squitieri | |
| 8,996,432 | B1 | 3/2015 | Fu | |
| 9,149,211 | B2 | 10/2015 | Mravyan et al. | |
| 9,668,927 | B2 | 6/2017 | Campbell | |
| 9,808,084 | B2 | 11/2017 | Di Censo et al. | |
| 2001/0005073 | A1 | 6/2001 | Choi et al. | |
| 2003/0075959 | A1 * | 4/2003 | Xue | B60N 2/66 297/284.4 |
| 2007/0216207 | A1 * | 9/2007 | Stossel | B60N 2/6671 297/284.4 |
| 2008/0007103 | A1 * | 1/2008 | Welles | A61B 5/6887 297/330 |
| 2012/0283929 | A1 * | 11/2012 | Wakita | B60N 2/643 701/99 |
| 2015/0321590 | A1 * | 11/2015 | Mizoi | B60N 2/42 297/284.1 |
| 2016/0037926 | A1 | 2/2016 | Lee | |
| 2017/0128297 | A1 | 5/2017 | Cernasov et al. | |
| 2017/0325599 | A1 | 11/2017 | Bellam et al. | |
| 2018/0154812 | A1 * | 6/2018 | McMillen | B60N 2/22 |
| 2018/0199729 | A1 | 7/2018 | Bullard et al. | |
| 2019/0248260 | A1 * | 8/2019 | Yoshikawa | B60N 2/2222 |
| 2020/0223326 | A1 | 7/2020 | Tanaka et al. | |
| 2020/0247290 | A1 * | 8/2020 | Line | B60N 2/66 |
| 2021/0078448 | A1 * | 3/2021 | Kaku | B60N 2/002 |
| 2021/0169234 | A1 * | 6/2021 | Jacobs | H01R 24/78 |
| 2021/0204837 | A1 * | 7/2021 | Jurasch | A61B 5/1102 |
| 2022/0202201 | A1 * | 6/2022 | Zenzmaier | A47C 7/72 |
| 2024/0287964 | A1 * | 8/2024 | Lee | F03D 3/06 |

OTHER PUBLICATIONS

Li, C., et al.; "Evaluation of the effect of different sitting assistive devices in reclining wheelchair on interface pressure;" BioMedical Engineering Online (2017) 16:108; DOI 10.1186/s12938-017-0398-8; published Aug. 29, 2017.

Medgadget; "Wheelchair Cushion with Smart Capabilities Avoids Pressure Ulcers;" retrieved from https://www.medgadget.com/2018/09/wheelchair-cushion-with-smart-capabilities-avoids-pressure-ulcers.html; published Sep. 20, 2018.

Sadler, Z., et al.; "Initial estimation of the in vivo material properties of the seated human buttocks and thighs;" International Journal of Non-Linear Mechanics 107 (2018) 77-85; published Oct. 3, 2018.

Scott, J., et al.; "An Evaluation of Interface Pressure and Shear Force Patterns in Injury Prone Regions While Seated in an Articulating Chair;" Summer Biomechanics, Bioengineering and Biotransport Virtual Conference; 2 pages; published Jun. 14, 2021.

Scott, J., et al.; "Material Properties of the Thigh: Body Position Matters"; 42nd Annual Meeting of the American Society of Biomechanics; 2 pages; published Aug. 8, 2018.

* cited by examiner

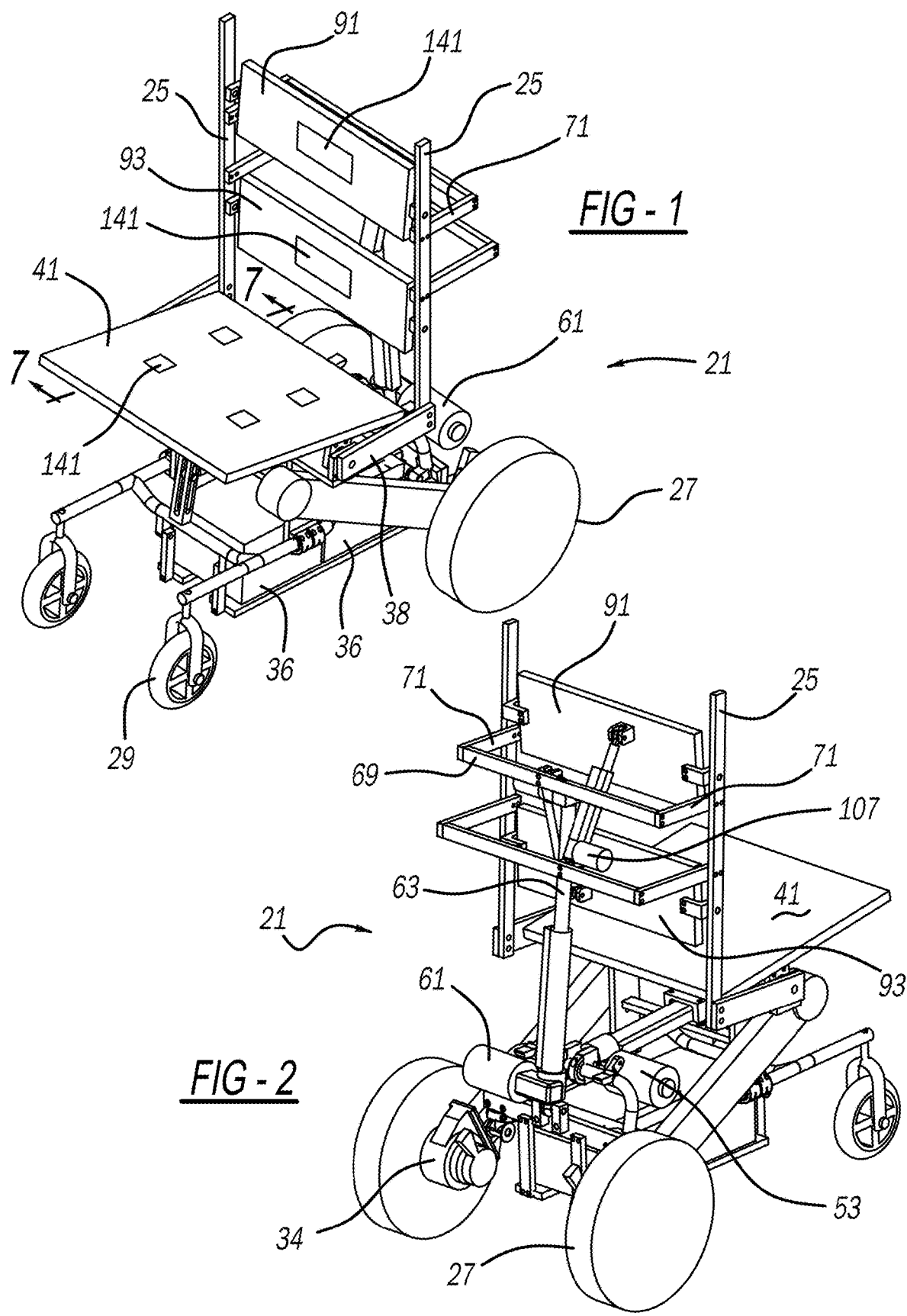

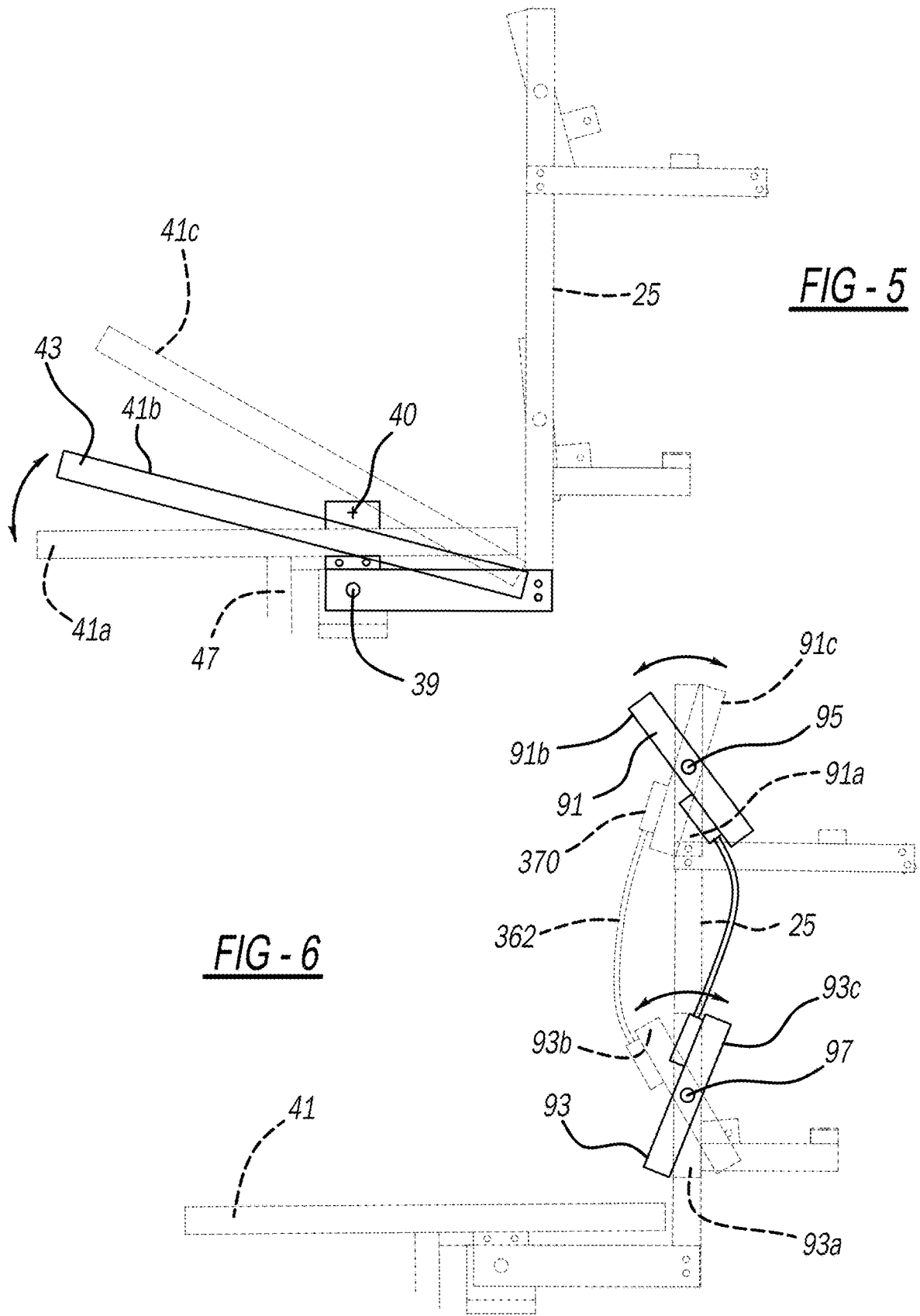

| Posture # | Description | Upper Back | Middle Back | Lower Back | Buttocks | Thighs |
|---|---|---|---|---|---|---|
| 1 | No recline, no tilt, neutral | Medium pressure | Medium pressure | Low pressure | High pressure | Low pressure |
| 2 | No recline, half tilt, slouched | Medium pressure | Low pressure | High pressure | Low pressure | Medium pressure |
| 3 | Half recline, no tilt, erect | Low pressure | Medium pressure | Low pressure | High pressure | Low pressure |
| 4 | Half recline, full tilt, slouched | Medium pressure | High pressure | High pressure | Low pressure | High pressure |
| 5 | No recline, no tilt, slouched | Low pressure | Low pressure | Medium pressure | High pressure | Low pressure |
| 6 | No recline, half tilt, erect | Low pressure | High pressure | Low pressure | Low pressure | Medium pressure |
| 7 | Full recline, no tilt, neutral | Medium pressure | Low pressure | Low pressure | High pressure | Low pressure |

*FIG - 8A*

| Posture # | Description | Upper Back | Middle Back | Lower Back | Buttocks | Thighs |
|---|---|---|---|---|---|---|
| 8 | No recline, full tilt, neutral | Medium pressure | High pressure | High pressure | Low pressure | High pressure |
| 9 | Half recline, no tilt, neutral | Medium pressure | Low pressure | Low pressure | High pressure | Low pressure |
| 10 | No recline, half tilt, erect | Low pressure | High pressure | Medium pressure | Low pressure | Medium pressure |
| 11 | Half recline, no tilt, slouched | Medium pressure | Low pressure | Medium pressure | High pressure | Low pressure |

*FIG - 8B*

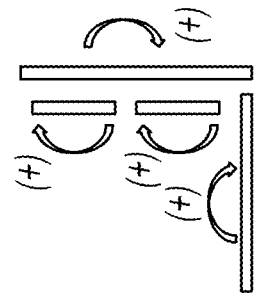

| Posture # | Description | Back Angle (from vertical) | Seat Pan Angle (from horizontal) | Pelvic Angle (from vertical) | Thoracic Angle (from vertical) |
|---|---|---|---|---|---|
| 1 | No recline, no tilt, neutral | 0° | 0° | 0° | 0° |
| 2 | No recline, half tilt, slouched | 0° | 15° | 5° | -15° |
| 3 | Half recline, no tilt, erect | 10° | 0° | -5° | 15° |
| 4 | Half recline, full tilt, slouched | 10° | 30° | 5° | -15° |
| 5 | No recline, no tilt, slouched | 0° | 0° | 5° | -15° |
| 6 | No recline, half tilt, erect | 0° | 15° | -5° | 15° |
| 7 | Full recline, no tilt, neutral | 20° | 0° | 0° | 0° |

*FIG - 9A*

| Posture # | Description | Back Angle (from vertical) | Seat Pan Angle (from horizontal) | Pelvic Angle (from vertical) | Thoracic Angle (from vertical) |
|---|---|---|---|---|---|
| 8 | No recline, full tilt, neutral | 0° | 30° | 0° | 0° |
| 9 | No recline, no tilt, neutral | 10° | 0° | 0° | 0° |
| 10 | No recline, half tilt, erect | 0° | 15° | -5° | 15° |
| 11 | Half recline, no tilt, slouched | 10° | 0° | 5° | -15° |

ARTICULATING CHAIR

CROSS-REFERENCE TO RELATED APPLICATIONS

The present application is a continuation of PCT Patent Application Serial No. PCT/US2023/013504, filed on Feb. 21, 2023, which claims priority to U.S. Provisional Patent Application No. 63/314,611, filed on Feb. 28, 2022, both of which are incorporated by reference herein.

GOVERNMENT RIGHTS

This invention was made with government support under CBET 1603646 awarded by the National Science Foundation. The government has certain rights in the invention.

BACKGROUND AND SUMMARY

The present disclosure generally pertains to an articulating chair and more particularly to an articulating chair with software-actuated supports.

Automatically adjustable seats have been attempted for airplane use. An example of such is disclosed in U.S. Patent Publication No. 2018/0199729 entitled "Automatically Adjusting Comfort System" which published to Bullard et al. on Jul. 19, 2018. This patent publication is incorporated by reference herein. This known airplane seat has a controller which receives data from a pressure-sensor array to determine pressure points which it then uses for adjusting fluid bladders, position motors and massagers. The actual mechanisms are not disclosed in detail and are likely to be too bulky and heavy for practical use in a battery powered or manually driven wheelchair, for example. Furthermore, while the control logic may be suitable for use in a seat stationarily affixed to an airplane floor, it lacks the details desired for long-term sitting of a disabled patient in a wheelchair or other articulating chair.

A long felt but unsolved need is to reduce pressure injuries, which are akin to soft tissue wounds, that affect many wheelchair users, especially those with spinal cord injuries. The buttocks and lower back are regions of the body that are especially prone to pressure injuries, which are due to large interface loads, both normal and shear, while seated. Resolving this concern is expected to improve the comfort of wheelchair users while saving considerable medical expenses for treating such chair-induced injuries. This traditional problem is recognized and measured data is disclosed in a publication co-authored by the present inventors: Sadler, Z., et al., "Initial Estimation of the In Vivo Material Properties of the Seated Human Buttocks and Thighs," Int'l Journal of Non-Linear Mechanics, 107, pp. 77-85 (Oct. 3, 2018).

Conventional attempts to solve wheelchair induced pressure injuries simply rely on the use of sensors to warn a nurse or caretaker to manually move the chair user. But this manual approach often lacks precision and timeliness, especially at night for home use, and creates a significant burden. One such known device is disclosed in U.S. Pat. No. 9,668,927 entitled "Pressure Relief Compliance System and Method for Monitoring Time Spent Applying or Releasing Pressure," which issued to Campbell on Jun. 6, 2017. This patent is incorporated by reference herein. The Campbell patent teaches a wheelchair monitoring system, however, a microprocessor merely activates an alarm if an undesired condition is sensed from a simple pressure-sensitive mat located between a seat cushion and the chair. Another prototype was developed by the University of Texas at Arlington, using pressure sensors on the bottom cushion of a wheelchair to map and transfer pressure via inflation and deflation of sections of the bottom cushion. But this prototype appears to merely place the sensor/inflation component loosely on top of the bottom cushion and is limited to movement only on the bottom cushion.

In accordance with the present invention, an articulating chair and a method of using same, include at least one actuator, a programmable controller, and movable upper back, lower back and seat bottom sections. In another aspect, an articulating wheelchair and a method of using same, include a seat bottom section, a lower frame to which the seat bottom section is coupled, floor-contacting wheels rotatably coupled to the lower frame, an upper back section, a lower back section, a back frame to which the upper back section and the lower back section are movably coupled, electromagnetic actuators coupled to the back sections, a battery mounted to at least one of the frames, and a programmable controller connected to the actuators and the battery. Yet another aspect of a method of operating a chair includes automatically varying orientations of multiple seat back sections and/or a seat bottom section, based upon at least one of: sensed user pressure signals against the sections, or programmed time intervals.

The present chair and method are advantageous over convention devices. For example, the present system beneficially provides a greater quantity and more localized, automatically moving sections, which provides improved pressure relief to the user for long-term sitting situations. The present chair and method also allow for independent movements between the sections, including an independent reclining motion with a lateral pivot axis adjacent to the user's hip joint center. Therefore, the present wheelchair may place the occupant in positions not available in traditional wheelchairs or other articulating chairs. Furthermore, the present chair and method employ a programmable controller with software instructions suitable for automatically cycling through predetermined and/or customized chair motions in a manner that unloads body regions that received harmful loaded pressures in conventional devices. The present chair and method advantageously allow for customized posture settings in the programmable controller, such as to account for torso articulations due to cerebral palsy, spina bifida, scoliosis or the like. Moreover, the present chair and method beneficially provide programmed control of an electromechanical actuator which automatically tilts a seat bottom or pan.

It is noteworthy that one or more of these features are optionally implemented in a lightweight manner for use in a battery-operated wheelchair. It is alternately envisioned that these features may be implemented in a stationary and upholstered, AC-powered, side chair. Additional advantages and features of the present system will become apparent with reference to the following description and claims, as well as the appended drawings.

BRIEF DESCRIPTION OF THE DRAWINGS

FIG. 1 is a perspective view showing a preferred embodiment of the present articulated wheelchair in a first set of positions;

FIG. 2 is a perspective view, opposite that of FIG. 1, showing the present articulated wheelchair in a second set of positions;

FIG. 5 is a fragmented side elevational view showing the present articulated wheelchair in various movement positions;

FIG. 6 is a fragmented side elevational view showing the present articulated wheelchair in various movement positions;

FIGS. 8A and 8B are a chart describing various movement positions of the present articulated wheelchair;

FIGS. 9A and 9B are a chart describing various movement positions of the present articulated wheelchair;

DETAILED DESCRIPTION

Figure 3:
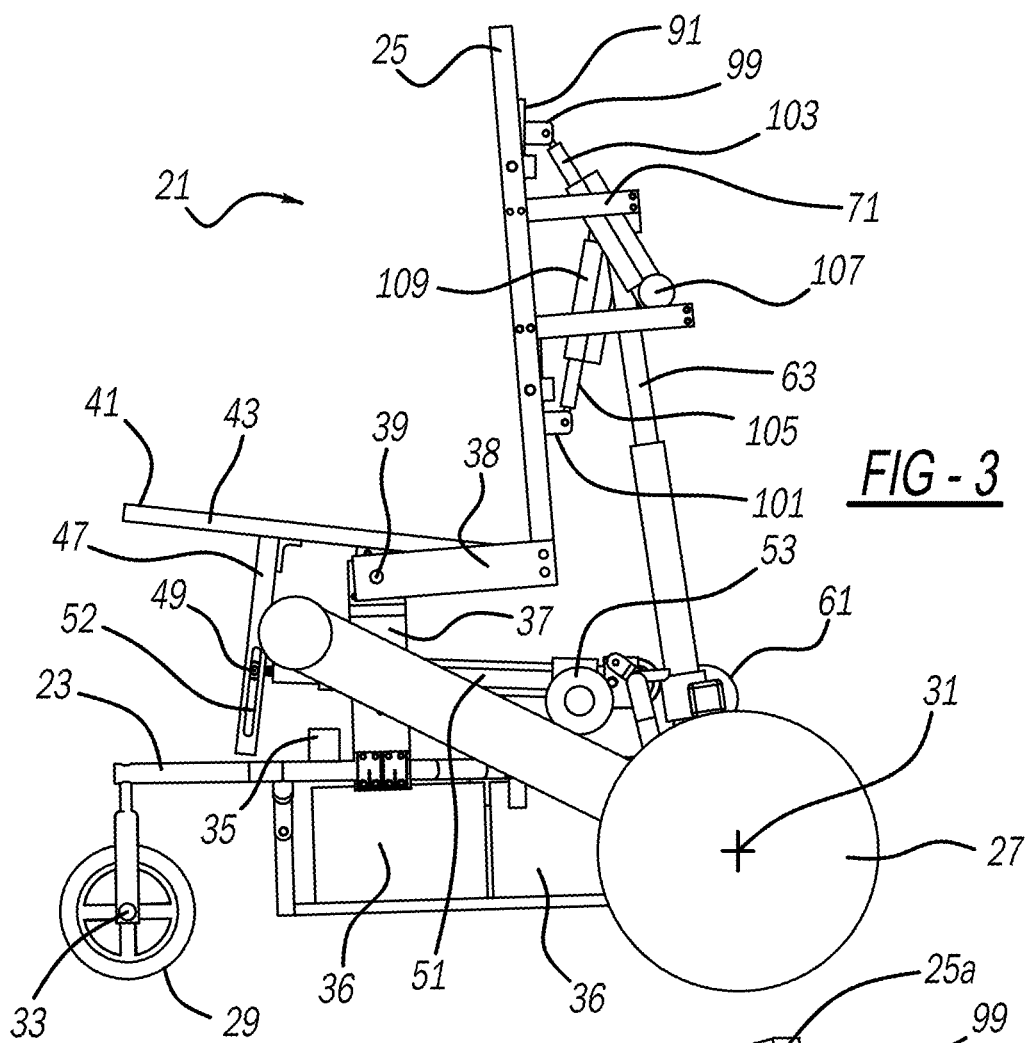
FIG. 3 is side elevational view showing the present articulated wheelchair in various movement positions.

Referring to FIGS. 1-3, a preferred embodiment of an articulating chair 21 includes a bottom frame or chassis 23 and a back frame 25. Rear wheels 27 and smaller diameter front wheels 29 are rotatably coupled to bottom frame 23 via pivots 31 and 33, respectively, and associated supports. An electric drive motor 34 and associated gear transmission rotates at least one of rear wheels 27 in response to user activation of control levers or buttons mounted to an armrest, which are connected to a programmable microprocessor controller 35. Controller 35 and a pair of DC batteries 36 are also mounted to the lower frame.

Pedestals 37 upstand from a central portion of bottom frame 23 to which are mounted legs 38, at a laterally extending and generally horizontal pivot axis 39. Legs 38 are generally parallel and laterally offset from each other, and rear ends of which are affixed to the generally vertically elongated and upwardly projecting beams of back frame 25. Thus, the legs and attached back frame beams define a generally right angle, offset, and rigidly connected configuration.

A seat bottom 41 includes a structurally rigid pan 43. Tabs 45 downwardly project from an underside of pan 43 and are tiltable about pivot axis 39, thereby movably coupling seat bottom 41 to lower frame 23. A post 47 downwardly extends from the underside of seat pan 43. A follower pin 49 connected to an end of an actuator rod 51, slides within a lost-motion camming slot 52 in post 47. An electromagnetic actuator 53, preferably a linear electric motor, causes rod 51 to linearly advance and retract, which moves pin 49 and, in turn, moves post 47, thereby tilting seat bottom 41 from a neutral and generally horizontal orientation 41a to an intermediately tilted orientation 41b and to a fully tilted orientation 41c, and back again, as can best be observed in FIG. 5. The seat bottom moves about pivot 40 in each tab upstanding in a stationary manner from pedestal 47 and/or the lower frame, on the lateral sides of the seat bottom.

Figure 4:
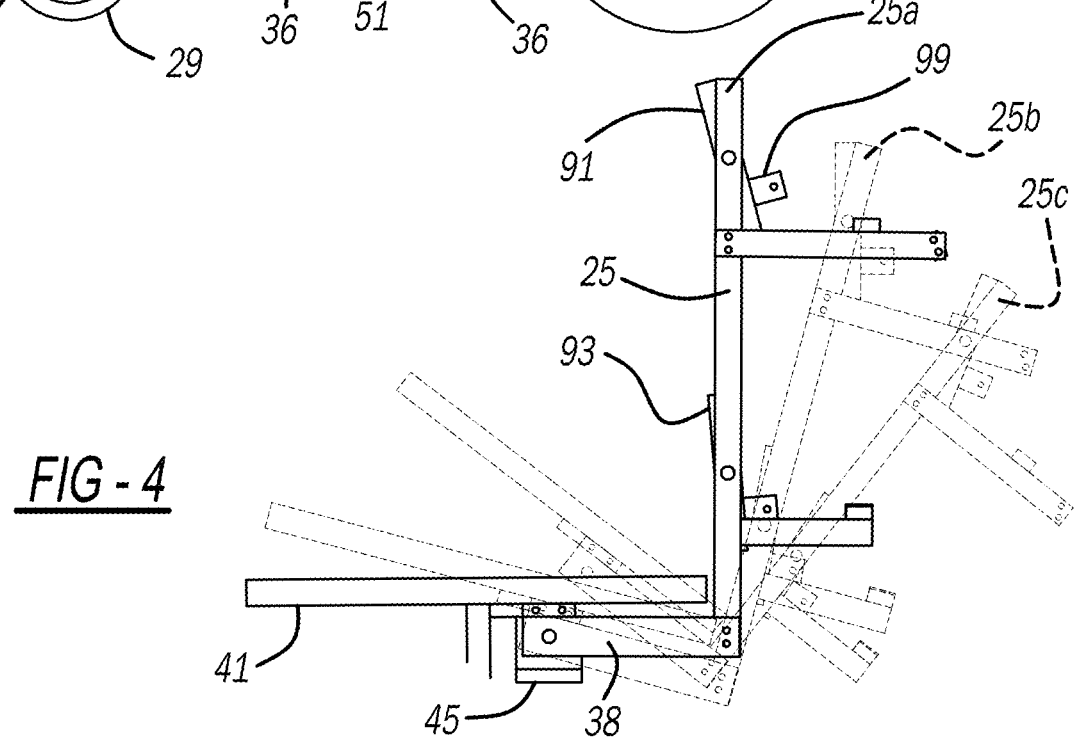
FIG. 4 is a fragmented side elevational view showing the present articulated wheelchair in various movement positions.

Referring now to FIGS. 1, 3 and 4, another electromagnetic actuator 61, preferably a linear electric motor, causes a rod 63 to linearly advance and retract to move a pin at a distal end thereof. Pin is coupled to a cross-arm 69 laterally spanning between arms 71 rearwardly projecting from seat back frame 25. Energization of actuator 61 causes tilted movement of seat back frame 25 from a neutral, generally vertical and longitudinally elongated orientation 25a, to an intermediate tilted orientation 25b, and to a fully tilted orientation 25c, as is shown in FIG. 4. When seat back frame 25 is tilted, legs 38 and seat bottom 41 will simultaneously move accordingly.

As can be observed in FIGS. 1-3 and 6, the seat back includes a movable thoracic section 91 and a movable pelvic section 93 which each tilt about a laterally extending pivot axis 95 and 97, respectively, relative to frame 25. Tabs 99 and 101 rearwardly extend from backsides of thoracic and pelvic sections 91 and 93, respectively, which are coupled to distal ends of rods 103 and 105, operably driven by linear motor actuators 107 and 109, respectively. Thus, actuator 107 can tilt thoracic section 91 between a neutral orientation 91a aligned with back frame 25, to a negative tilted orientation 91b (with a top edge forward of the back frame), to a positive tilted orientation 91c (with a top edge rearward of the back frame). Similarly, actuator 109 can tilt pelvic section 93 between a neutral orientation 93a aligned with back frame 25, to a negative tilted orientation 93b (with a top edge forward of the back frame), to a positive tilted orientation 93c (with a top edge rearward of the back frame).

Figure 7:
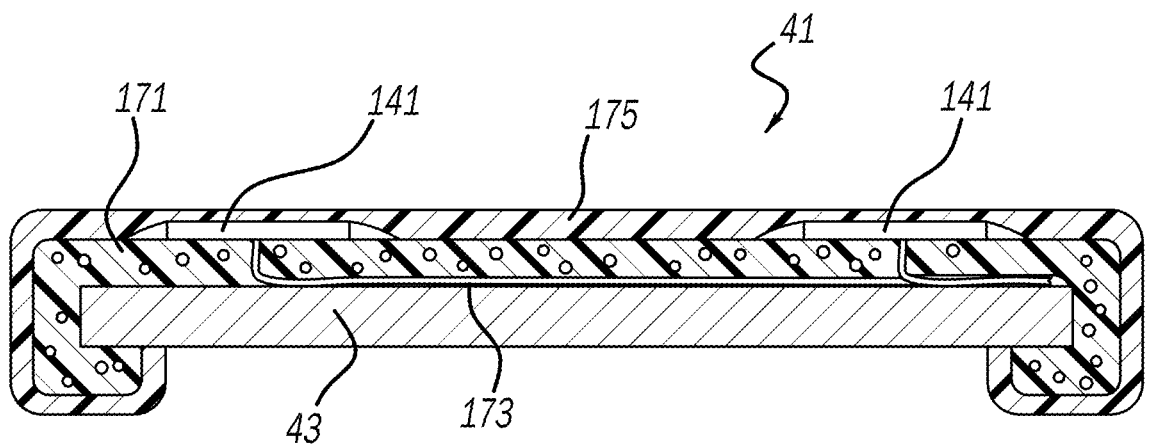
FIG. 7 is a cross-sectional view, taken along line 7-7 of FIG. 1, showing a seat bottom of the present articulated wheelchair.

FIGS. 1 and 7 illustrate optional pressure sensors 141 located on the seat bottom section, pelvic section and thoracic section. Exemplary sensors include piezoelectric or resistive printed ink type sensors. One such sensor may be a polymeric film force sensitive resistor that has a decrease in resistance with an increase in a user's body force thereon; it may have a circular or rectangular peripheral true view shape, with a force sensitivity of $0.1$-$10.0^2$ Newtons, a rise time of less than 3 microseconds, and a thickness of 0.2-1.25 mm. The sensors preferably measure force magnitude and send output signals of such.

Referring now to FIGS. 1 and 7, for each of sections 41, 91 and 93, sensors 141 are secured on top of or embedded within a pliable foam cushion 171 such as with adhesive. Cushion 171 is mounted on an upper surface of the rigid metallic structural support, such as seat pan 43. Electrical leads 173, connecting sensors 141 to an electrical circuit connected to controller 35 and batteries 36, extends through the cushion and then between the cushion and seat pan. A fabric or polymeric sheet 175 serves as a removable cover upon cushion 171.

FIGS. 8A-11 illustrate the different posture orientations of the movable seat sections, and the associated logic of software instructions run by a microprocessor of controller 35. The software is stored in non-transient memory, such as RAM or ROM, connected to the microprocessor and to electrical circuit. The software instructions serve to energize and deenergize the actuators, via DC battery current, in order to move the seat sections. In one optional arrangement, the controller and software will automatically move the seat sections based on predetermined time durations when the user is seated in the chair. In another optional arrangement, the controller and software will automatically move the seat sections based on personalized and adjustable time durations when the user is seated in the chair. In yet a further optional arrangement, the controller and software will automatically move the seat sections based on sensed user body pressure signals, sent by the sensors to the controller, when the user is seated in the chair. In still another optional arrangement, the controller and software will automatically move the seat sections based on both the time durations and sensed user pressure, when the user is seated in the chair. A different or additional optional configuration has the controller and software automatically cycling section movement through a sequence of various postures based on predetermined or customizable adjustable times and orientations.

More specifically, the controller and software will cause the sections to move to at least the following orientations to reduce undesired pressure (i.e., unloads) against different back and buttocks areas of the chair user, using the following methodology:

energizing an actuator to automatically tilt a seat bottom section to be in an intermediate tilted orientation between +/−5-15° relative to a neutral bottom position, about a substantially horizontal pivot axis;

energizing an actuator to automatically tilt the seat bottom section to be in a fully tilted orientation of at least +/−15° (e.g., 20°) relative to the neutral bottom position, about the pivot axis;

energizing an actuator to automatically tilt a thoracic section to be in an intermediate tilted orientation between +/−5-15° relative to a thoracic neutral position;

energizing an actuator to automatically tilt the thoracic section to be in a fully tilted orientation of at least +/−15° (e.g., 20°) relative to the thoracic neutral position;

energizing an actuator to automatically tilt the pelvic section to be in an intermediate tilted orientation between +/−5-15° relative to a pelvic neutral position;

energizing an actuator to automatically tilt the pelvic section to be in a fully tilted orientation of at least +/−15° (e.g., 20°) relative to the pelvic neutral position; and the thoracic section, the pelvic section and the seat bottom section each being moveable independently of the other in at least one operating condition.

In another condition, the controller and software will automatically cause the sections to move, using the following methodology:

sensing a user pressure or force characteristic against a seat bottom section;

sensing a user pressure or force characteristic against at least one of: (i) a thoracic section or (ii) a pelvic section, of a seat back;

sending sensed signals from the sections to a programmable controller mounted to the chair;

determining durations that the characteristics are sensed for each of the sections, via the controller;

comparing the durations with threshold values for each section, via the controller;

energizing at least one actuator to automatically tilt the seat bottom section if the comparison for the seat bottom section exceeds a first desired value; and energizing the at least one actuator to automatically tilt at least one of: (i) the thoracic section or (ii) the pelvic section, if the comparison for the thoracic or the pelvic section exceeds a second desired value.

Additionally, the controller automatically controls at least the following motions based on the sensed characteristic signals:

causing the thoracic section to be in a neutral untilted orientation;

causing the thoracic section to be in a tilted and positively angled orientation; and causing the thoracic section to be in a tilted and negatively angled orientation.

Additionally, the controller automatically controls at least the following motions based on the sensed characteristic signals:

causing the pelvic section to be in a neutral untilted orientation, due to the controller energizing a first electromagnetic actuator of the at least one actuator;

causing the pelvic section to be in a tilted and positively angled orientation, due to the controller energizing the first electromagnetic actuator;

causing the pelvic section to be in a tilted and negatively angled orientation, due to the controller energizing the first electromagnetic actuator;

causing the seat bottom section to be in a neutral untilted orientation, due to the controller energizing a second electromagnetic actuator of the at least one actuator; and causing the seat bottom to be in a tilted angled orientation, due to the controller energizing the second electromagnetic actuator.

In the chart of FIGS. 8A-9B, the "slouched" posture is where thoracic section 91 is in position 91b and pelvic section 93 is in position 93c, as shown in FIG. 6. Furthermore, the "erect" posture is where thoracic section 91 is in position 91c and pelvic section 93 is in position 93b. In other words, the back section positions differently curve or straighten the user's spine. Moreover, the "full recline," "half recline" and "no recline" descriptions refer to the seat back angles 25c, 25b and 25a, respectively, as depicted in FIG. 4. Additional postures may be provided in certain optional configurations.

In one example, a desired duration threshold is 20-30 minutes in each section orientation. A manual override switch is employed to stop section movement during meals. An additional driving motor joystick, switches or other user-operated controls are provided on an armrest, head-mounted or other location, coupled to controller, to automatically rotate and steer the wheels.

Advantageously, the seat pan tilt is independent of the back recline motion, and has pivot 40 (see FIG. 5) about the approximate user's hip joint center. Additionally, the recline of the seat back pivots about this same point—the approximate hip joint center. Therefore, the present wheelchair design has the ability to place the occupant in positions not available in traditional wheelchairs. The presently disclosed and/or differing pivot or even arcuately traversing fore-aft and/or laterally linkage movements can be provided for seat back articulations (e.g., the thorax and pelvis) to cater to special user populations whose torso articulation is affected. For example, individuals with cerebral palsy, spina bifida or scoliosis.

Figure 12:
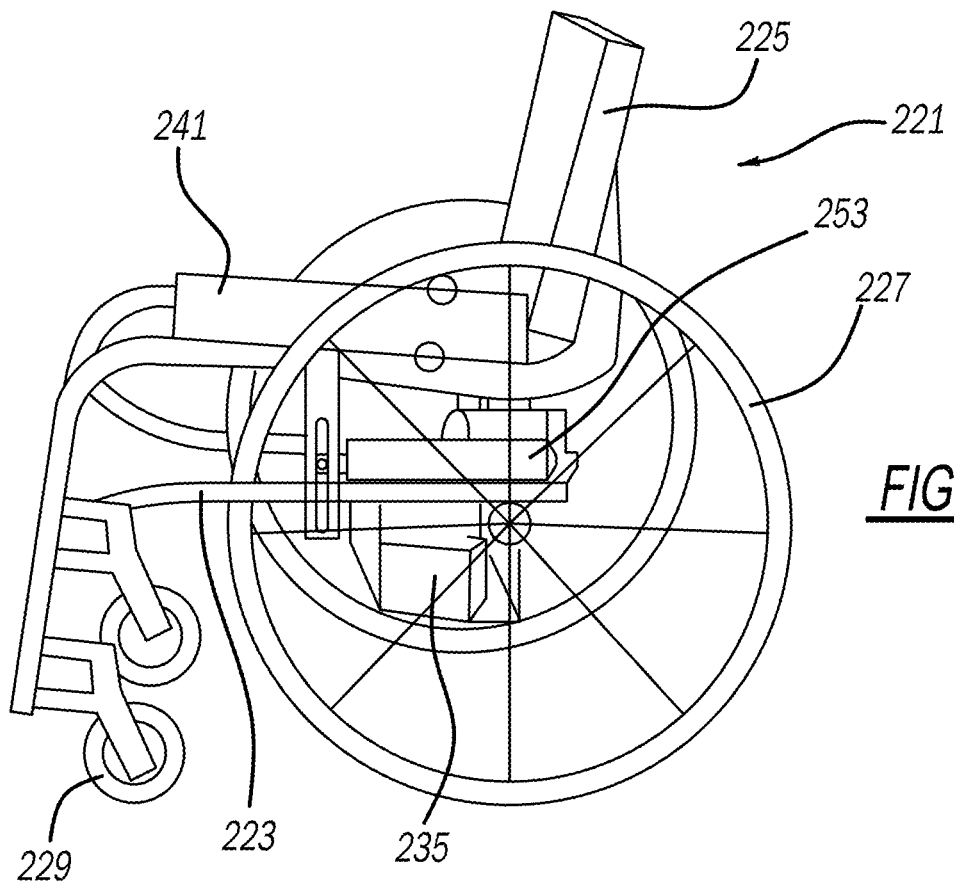
FIGS. 12 and 13 are side elevational views showing an alternate embodiment wheelchair in various movement positions.
Figure 13:
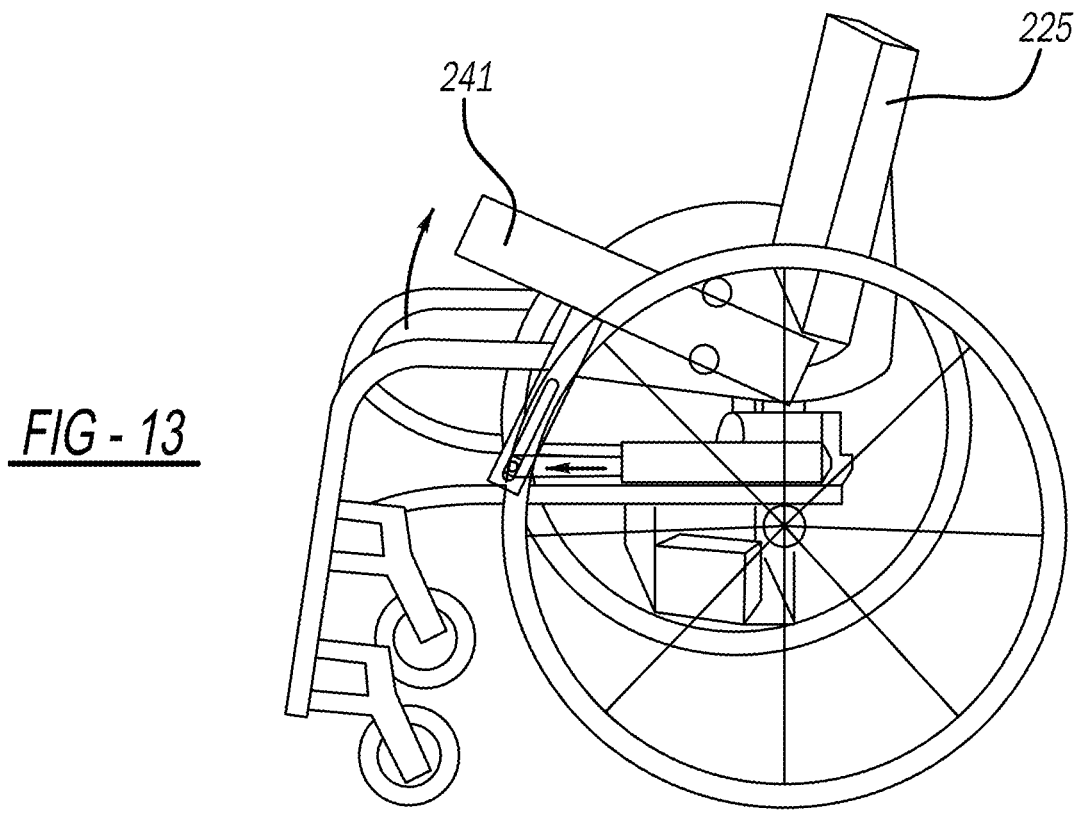

A self-propelled or manually rotated version of a wheelchair 221 can be observed in FIGS. 12 and 13. This configuration employs large driving wheels 227 and small forward wheels 229 coupled to a lower frame 223. A seat back 225 is either fixed or manually tiltable relative to frame 223. A tiltable seat bottom 241 can be automatically moved from a neutral and generally horizontal orientation shown in FIG. 12, to the rearwardly rotated orientation shown in FIG. 13 via an electromagnetic actuator 253 and transmission mechanism like that discussed with regard to the FIG. 3 embodiment hereinabove. Intermediate and/or forward tilting may optionally be employed.

A microprocessor controller and battery 235 are also mounted to frame 223 for controlling and energizing actuator 253. Optional pressure/force sensors, like those discussed above, may be mounted on the seat bottom. This wheelchair is optionally foldable or collapsible for light weight portability and storage. This exemplary seat bottom-only movement design can also be employed on a powered and self-propelled wheelchair like that of the previous embodiment.

Figure 16:
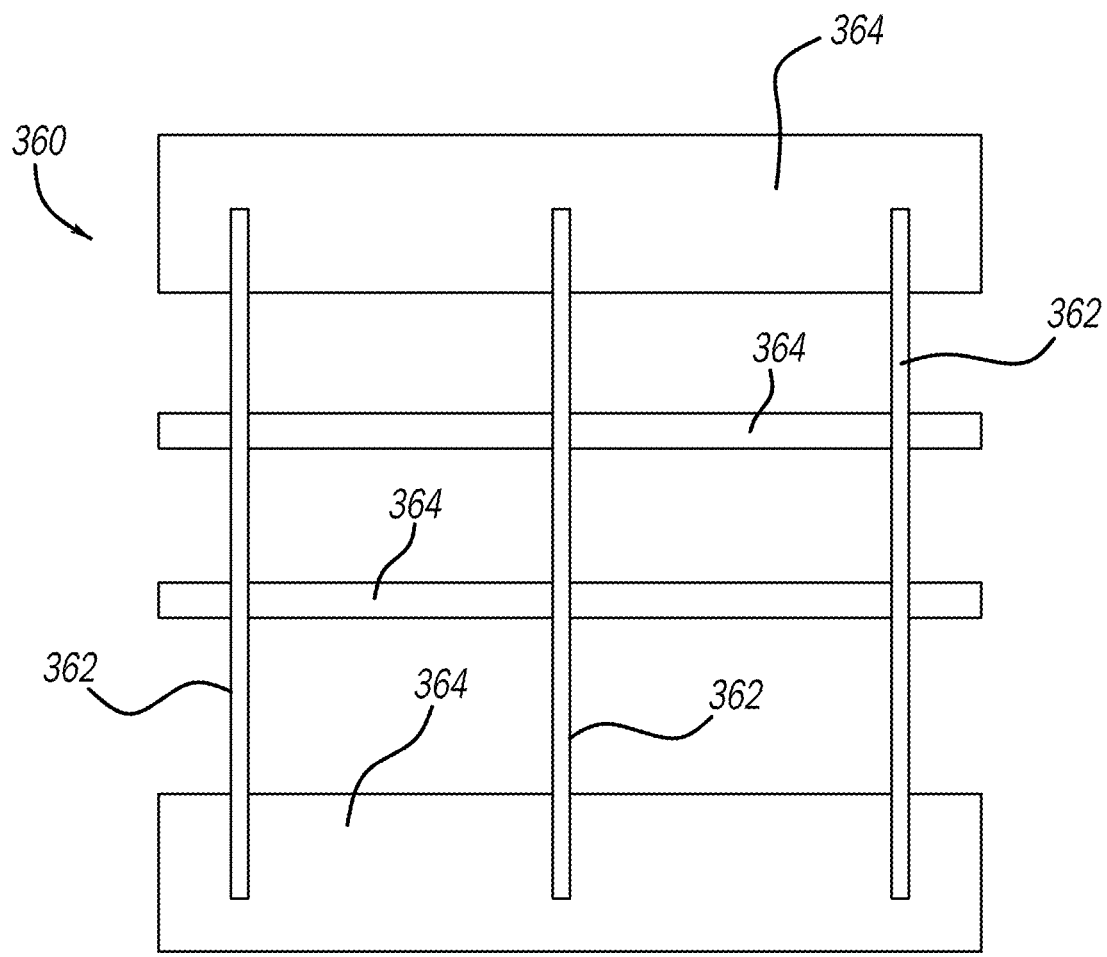
FIG. 16 is a diagrammatic front elevational view showing a back support lattice used with any of the embodiments herein.
Figure 9B:
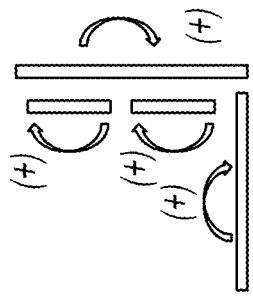
Figure 10A:
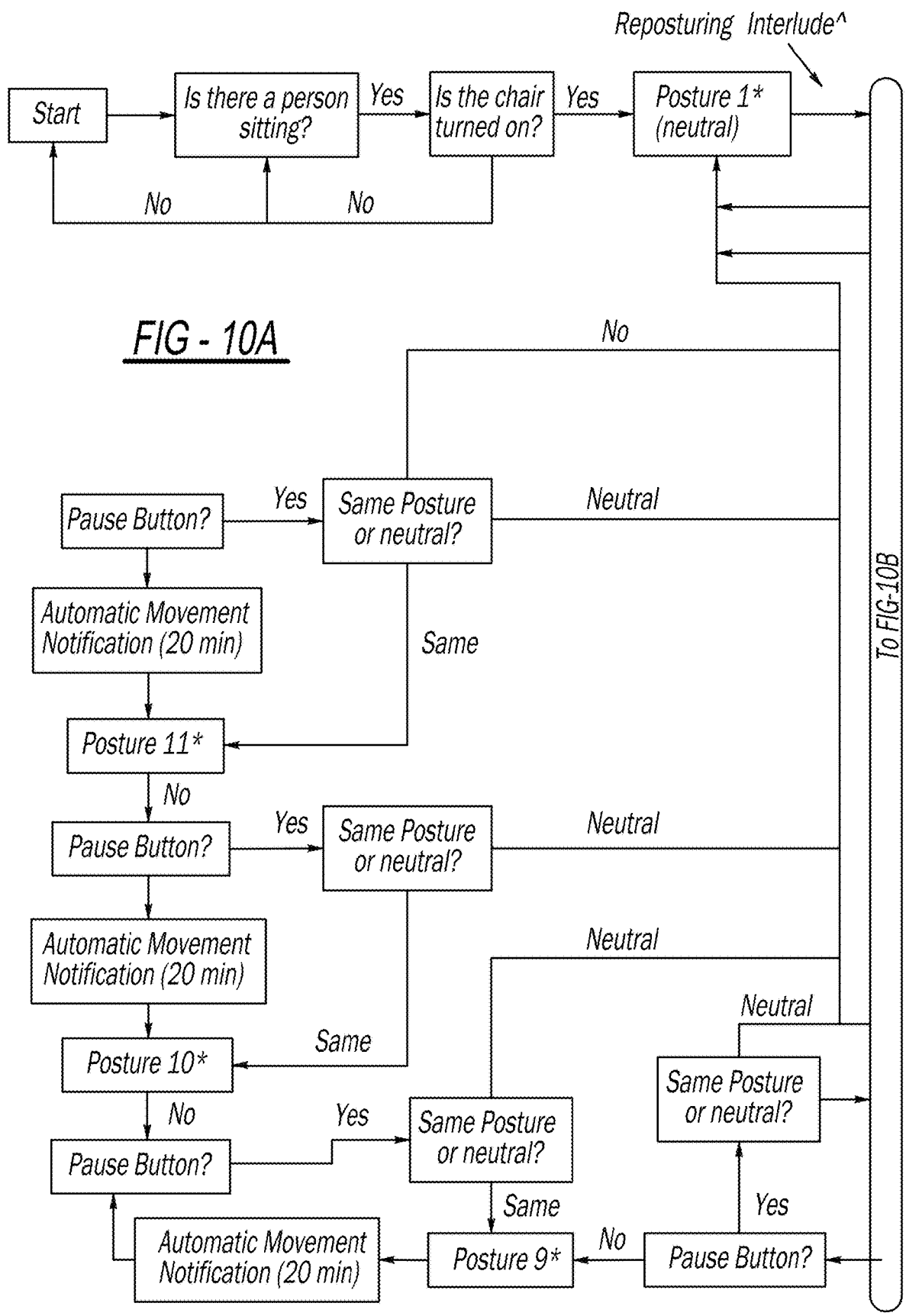
FIGS. 10A-10C are software flow diagrams of the present articulated wheelchair.
Figure 10B:
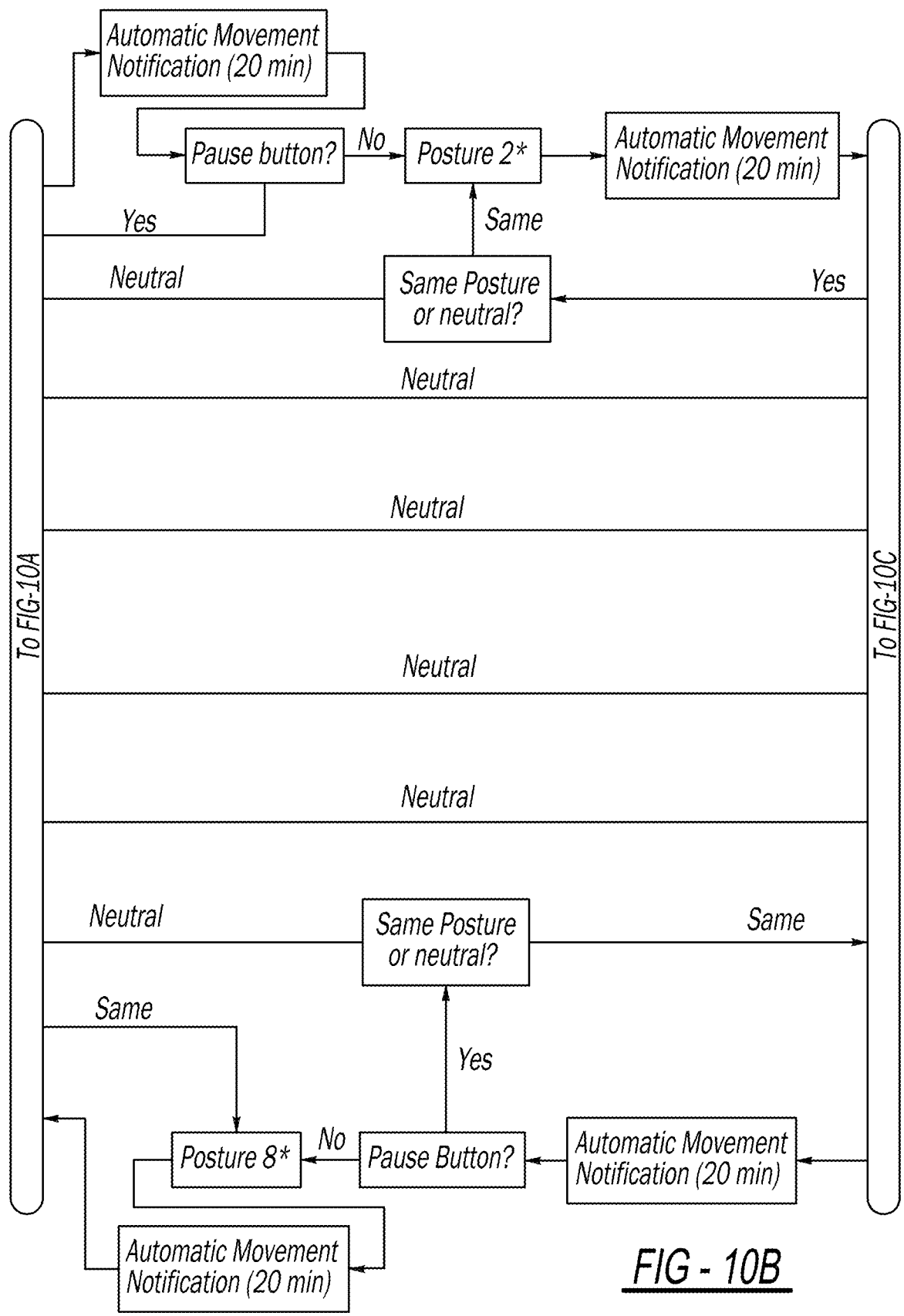
Figure 10C:
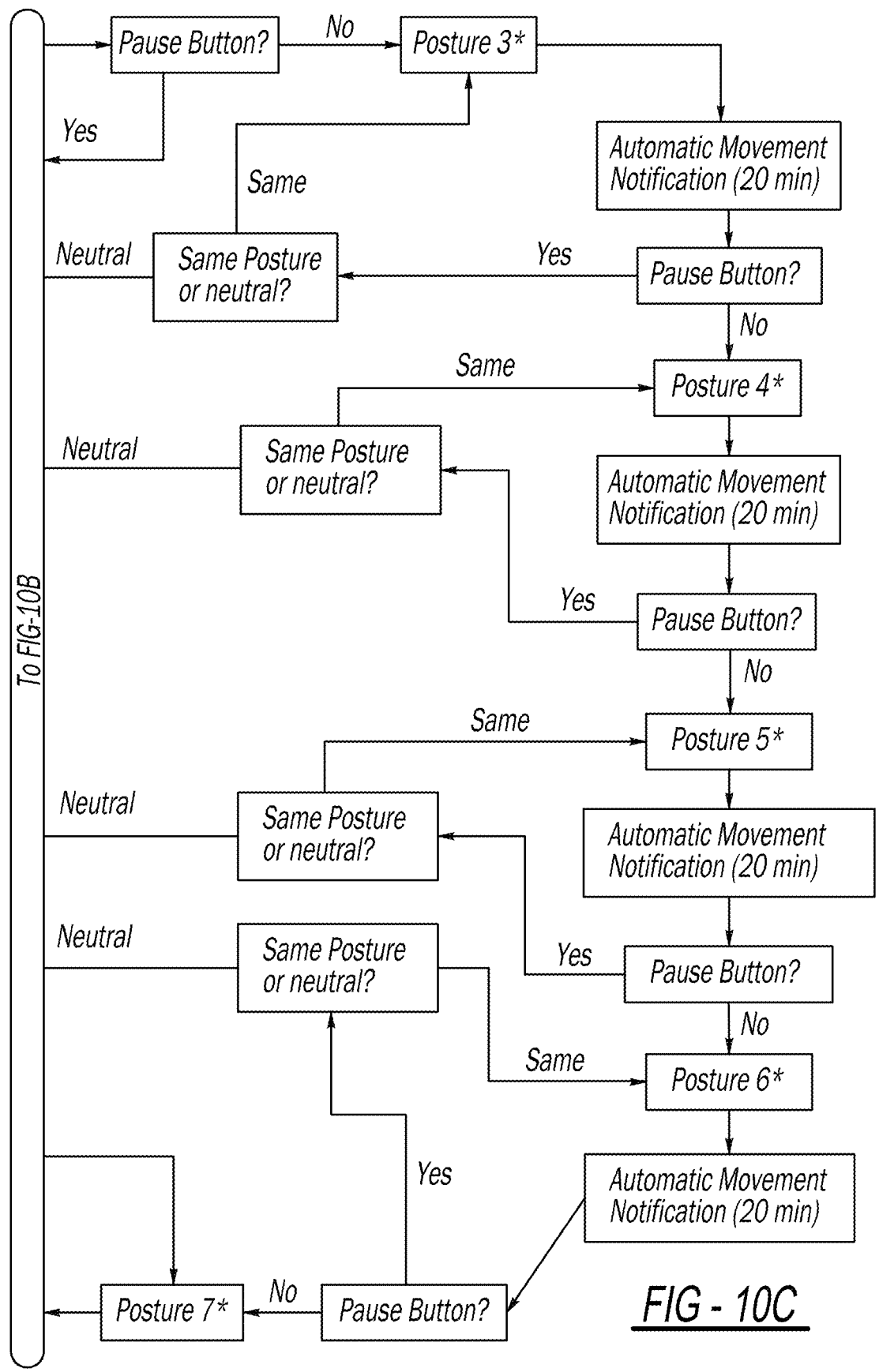
Figure 11:
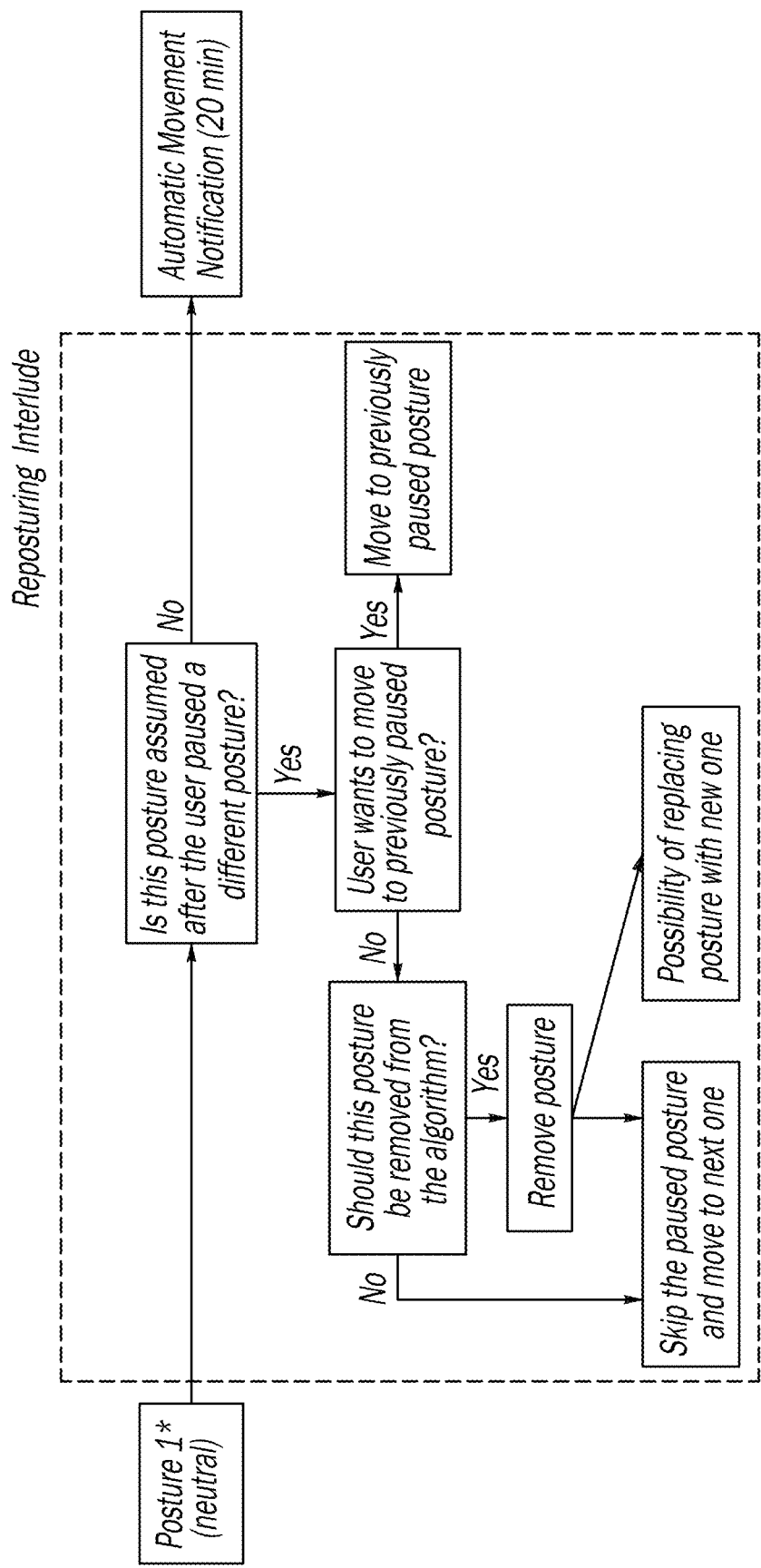
FIG. 11 is a software flow diagram of the present articulated wheelchair.
Figure 14:
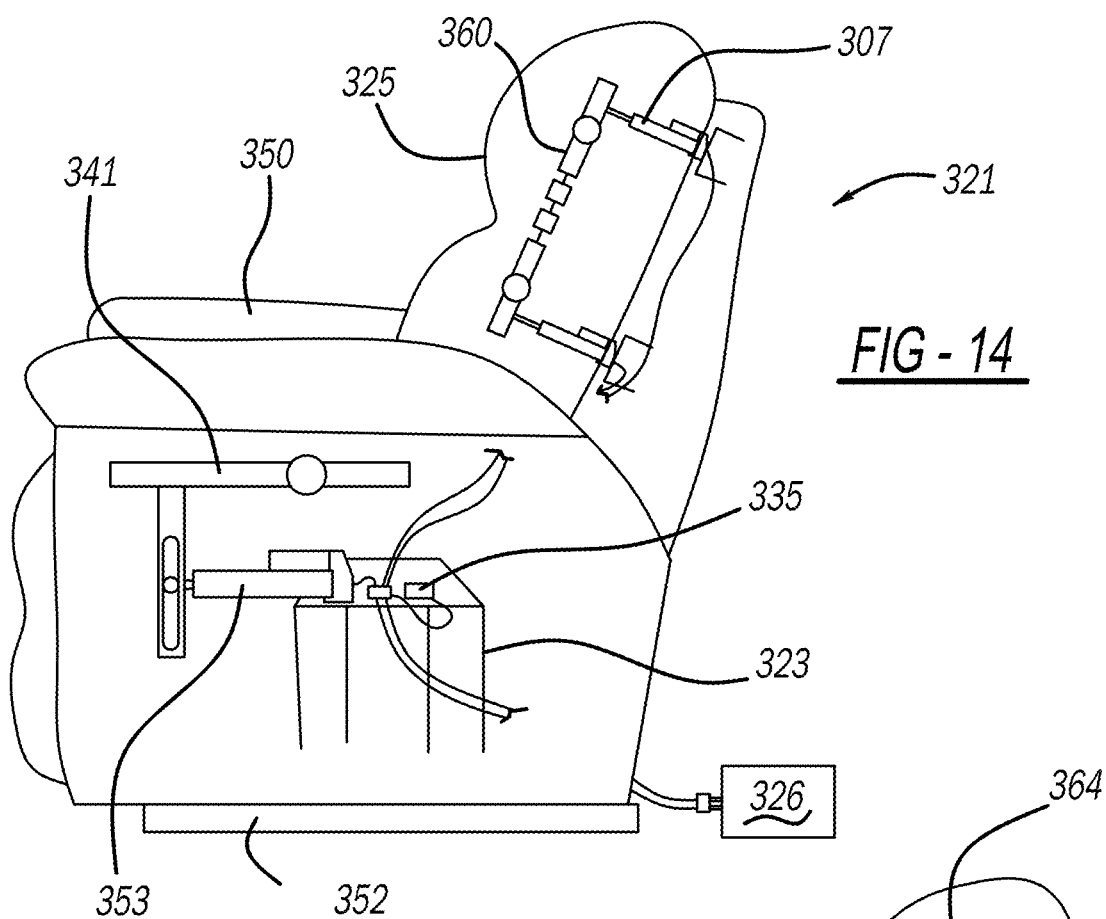
FIGS. 14 and 15 are side diagrammatic views showing a second alternate embodiment reclining chair in various movement positions.
Figure 15:
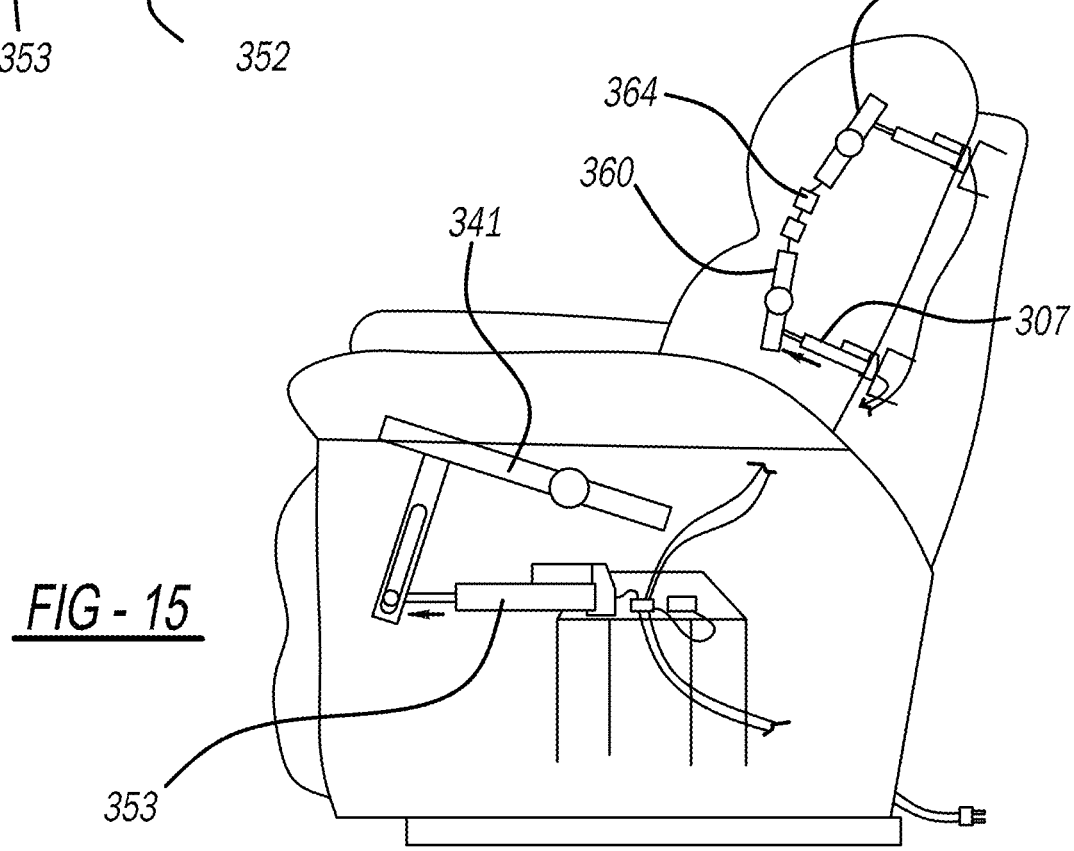

Referring now to FIGS. 14-16, an upholstered, reclining side chair 321 includes a seat bottom 341, a seat back 325 and armrests 350. A generally stationary support 352 or feet are located between a bottom frame 323 of the articulating chair and a building floor. An electromagnetic actuator 353 tilts seat bottom 341 between the neutral position of FIG. 14 and the rearwardly tilted intermediate and/or full orientations of FIG. 15, with a movement transmission like that of the FIG. 3 embodiment.

However, moveable thoracic and pelvic sections are incorporated into a unified curvable and straightenable back section 360. Back section 360 includes a lattice of thin and flexible posts 362, elongated in a generally vertical direction (when the seat back is in a raised condition). Posts 362 are made of thin wooden poles, flexible polymeric rods or spring steel wires. Slats 364 laterally span between and are coupled to posts 362. Slats 364 are made from wood or polymeric members with a longer lateral than thickness or vertical dimensions. Multiple electromagnetic actuators 307 are coupled to spaced apart areas of seat back section 360 to provide different curving configurations thereto by bending intermediate areas of posts 362 relative to fixed ends thereof, as can be seen by comparing FIGS. 14 and 15. A controller 335, running software instructions, couples an AC power supply 336 to actuators 307, and automatically controls seat bottom and back posture movement based on user pressure sensors and/or durations. This side chair is ideally suited for use in a medical facility such as an assisted living center for use by handicapped individuals who sit in the chair for many hours at a time.

It should be appreciated that the lattice may also be optionally incorporated into the first embodiment wheelchair 21, as is illustrated in FIG. 6. For example, flexible posts 362 have their ends slidable receivable within hollow receptacles 370 mounted to front or back surfaces of tiltable thoracic section 91 and tiltable pelvic section 93 to span across the vertical gap therebetween to add comfort to the user. Foam cushions and covers will hide the receptacles and tiltable sections therein, and optionally hide the user-facing surfaces of the lattice.

While various configurations have been disclosed hereinabove, additional variations may be employed with the present system. For example, additional or different actuators and movement transmission mechanisms may be used with the present articulating chair, although certain advantages may not be realized. Furthermore, additional, or modified software steps may be provided, although some benefits may not be achieved. Structural and functional features of each embodiment may be interchanged between other embodiments disclosed herein, and all of the claims may be multiply dependent on the others in all combinations. It is intended by the following claims to cover these and any other departures from the disclosed embodiments which fall within the true spirit and scope of the present invention.

The invention claimed is:

1. A method of operating a chair, the method comprising:
   (a) energizing at least one actuator to automatically tilt a seat bottom section to be in an intermediate tilted orientation between +/−5-15° relative to a neutral bottom position, about a substantially horizontal pivot axis;
   (b) energizing the at least one actuator to automatically tilt the seat bottom section to be in a fully tilted orientation of at least +/−15° relative to the neutral bottom position, about the pivot axis;
   (c) energizing the at least one actuator to automatically tilt a thoracic section to be in an intermediate tilted orientation between +/−5-15° relative to a thoracic neutral position;
   (d) energizing the at least one actuator to automatically tilt the thoracic section to be in a fully tilted orientation of at least +/−15° relative to the thoracic neutral position;
   (e) energizing the at least one actuator to automatically tilt the pelvic section to be in an intermediate tilted orientation between +/−5-15° relative to a pelvic neutral position;
   (f) energizing the at least one actuator to automatically tilt the pelvic section to be in a fully tilted orientation of at least +/−15° relative to the pelvic neutral position;
   (g) the thoracic section, the pelvic section and the seat bottom section each being moveable independently of the other in at least one operating condition; and
   (h) a programmable controller, controlling the at least one actuator, automatically varying orientations of the sections based upon at least one of: (i) sensed user pressure or force characteristic signals from sensors positioned on all of the tiltable sections, or (ii) at least one actual user duration value exceeding at least one desired threshold duration value;
   (i) wherein the programmable controller causes the at least one actuator to:
      tilt a lower edge of the thoracic section forwardly of a substantially vertical plane of a seat back frame; and
      tilt an upper edge of the pelvic section forwardly of the substantially vertical plane of the seat back frame.

2. The method of claim 1, wherein the controller automatically varies the orientations based upon both (i) and (ii).

3. The method of claim 1, wherein the chair is a wheelchair comprising:
   a lower frame to which the seat bottom section is coupled;
   rotating floor-contacting wheels coupled to the lower frame;
   a back frame to which the thoracic section and the pelvic section are coupled; and
   energizing an electromagnetic actuator to tilt the back frame relative to the lower frame.

4. The method of claim 1, wherein the programmable controller is a wheelchair-mounted controller configured to automatically energize the at least one actuator to:
   (a) tilt an upper edge of the thoracic section forwardly of a substantially vertical plane of a seat back frame; and
   (b) tilt a lower edge of the pelvic section forwardly of the substantially vertical plane of the seat back frame.

5. The method of claim 1, wherein the programmable controller is a wheelchair-mounted controller to automatically energize the at least one actuator which includes multiple electromagnetic actuators.

6. The method of claim 1, further comprising collapsing the chair, which is a wheelchair, between an expanded use condition and a folded stored condition, and manually rotating wheels coupled to a frame substantially below the seat bottom section.

7. The method of claim 1, wherein the at least one actuator comprises a first electromagnetic actuator having an end coupled to the seat bottom section, a second electromagnetic actuator having an end coupled to the thoracic section, and a third electromagnetic actuator having an end coupled to the pelvic section, further comprising energizing an electric motor to propel a wheel rotatably coupled to a chassis upon which the sections and actuators are coupled.

8. A method of operating a chair, the method comprising:
   (a) energizing at least one actuator to automatically tilt a seat bottom section to be in an intermediate tilted orientation between +/−5-15° relative to a neutral bottom position, about a substantially horizontal pivot axis;
   (b) energizing the at least one actuator to automatically tilt the seat bottom section to be in a fully tilted orientation of at least +/−15° relative to the neutral bottom position, about the pivot axis;
   (c) energizing at least one actuator to automatically tilt a thoracic section to be in an intermediate titled orientation between +/−5-15° relative to a thoracic neutral position;
   (d) energizing the at least one actuator to automatically tilt the thoracic section to be in a fully tilted orientation of at least +/−15° relative to the thoracic neutral position;
   (e) energizing the at least one actuator to automatically tilt a pelvic section to be in an intermediate tilted orientation between +/−5-15° relative to a pelvic neutral position;
   (f) energizing the at least one actuator to automatically tilt the pelvic section to be in a fully tilted orientation of at least +/−15° relative to the pelvic neutral position;
   (g) the thoracic section, the pelvic section and the seat bottom section each being moveable independently of the other in at least one operating condition;
   (h) sensing a first user pressure or force characteristic against the seat bottom section with at least one bottom sensor having a thickness at or less than 1.25 mm;
   (i) sensing a second user pressure or force characteristic against the thoracic section with at least one thoracic sensor having a thickness at or less than 1.25 mm;
   (j) sensing a third user pressure or force characteristic against the pelvic section with at least one pelvic sensor having a thickness at or less than 1.25 mm;
   (k) sending sensed signals from the sections to a controller, which is mounted to the chair;
   (l) comparing a magnitude of the sensed signals to at least one desired threshold value, via the controller; and
   (m) the controller causing the at least one actuator to tilt at least one of the sections if a magnitude of at least one of the sensed signals exceeds the desired threshold value;
   (n) wherein the controller causes the at least one actuator to:
      tilt a lower edge of the thoracic section forwardly of a substantially vertical plane of a seat back frame; and
      tilt an upper edge of the pelvic section forwardly of the substantially vertical plane of the seat back frame.

9. The method of claim 8, further comprising placing the sensors, which are piezoelectric or printed ink sensors, between a cushion and a cover for each of the sections, the cushion being mounted upon a rigid support coupled to the at least one actuator, and connecting the sensors to an electrical circuit including a DC battery and the controller.

10. The method of claim 8, wherein the controller is a programmable controller, controlling the at least one actuator, automatically varying orientations of the sections based upon at least one of: (i) sensed user pressure or force characteristic signals from sensors positioned on all of the tiltable sections, or (ii) at least one actual user duration value exceeding at least one desired threshold duration value.

11. The method of claim 8, wherein the chair is a wheelchair comprising:
   a lower frame to which the seat bottom section is coupled;
   rotating floor-contacting wheels coupled to the lower frame;
   a back frame to which the thoracic section and the pelvic section are coupled; and
   energizing an electromagnetic actuator to tilt the back frame relative to the lower frame.

12. The method of claim 8, further comprising flexible and spaced apart posts, extending in a substantially vertical direction, coupled to a back frame, the posts being moveable between curved and straight configurations by the at least one actuator.

13. The method of claim 8, wherein the at least one actuator comprises a first electromagnetic actuator having an end coupled to the seat bottom section, a second electromagnetic actuator having an end coupled to the thoracic section, and a third electromagnetic actuator having an end coupled to the pelvic section.

14. A method of operating a chair, the method comprising:
   (a) energizing at least one actuator to automatically tilt a seat bottom section to be in an intermediate tilted orientation between +/−5-15° relative to a neutral bottom position, about a substantially horizontal pivot axis;
   (b) energizing the at least one actuator to automatically tilt the seat bottom section to be in a fully tilted orientation of at least +/−15° relative to the neutral bottom position, about the pivot axis;
   (c) energizing the at least one actuator to automatically tilt a thoracic section to be in an intermediate tilted orientation between +/−5-15° relative to a thoracic neutral position;
   (d) energizing the at least one actuator to automatically tilt the thoracic section to be in a fully tilted orientation of at least +/−15° relative to the thoracic neutral position;
   (e) energizing the at least one actuator to automatically tilt a pelvic section to be in an intermediate tilted orientation between +/−5-15° relative to a pelvic neutral position;
   (f) energizing the at least one actuator to automatically tilt the pelvic section to be in a fully tilted orientation of at least +/−15° relative to the pelvic neutral position;
   (g) the thoracic section, the pelvic section and the seat bottom section each being moveable independently of the other in at least one operating condition; and
   (h) flexible and spaced apart posts, extending in a substantially vertical direction, coupled to a back frame, the posts being moveable between curved and straight configurations by the at least one actuator;
   (i) wherein each of the thoracic and pelvic sections comprises a support pivotally coupled to the back frame for rotation about a laterally extending horizontal axis at a middle in a vertical direction of each of the supports.

15. The method of claim 14, further comprising a programmable controller, controlling the at least one actuator, automatically varying orientations of the sections based upon at least one of: (i) sensed user pressure or force characteristic signals from sensors positioned on all of the tiltable sections, or (ii) at least one actual user duration value exceeding at least one desired threshold duration value.

16. The method of claim 14, wherein the chair is a wheelchair comprising:

a lower frame to which the seat bottom section is coupled;
rotating floor-contacting wheels coupled to the lower frame;
a back frame to which the thoracic section and the pelvic section are coupled; and
energizing an electromagnetic actuator to tilt the back frame relative to the lower frame.

17. The method of claim 14, wherein the at least one actuator comprises a first electromagnetic actuator having an end coupled to the seat bottom section, a second electromagnetic actuator having an end coupled to the thoracic section, and a third electromagnetic actuator having an end coupled to the pelvic section.

18. A method of operating a chair, the method comprising:
   (a) sensing a user pressure or force characteristic against a seat bottom section;
   (b) sensing a user pressure or force characteristic against at least one of: (i) a thoracic section or (ii) a pelvic section, of a seat back;
   (c) sending sensed signals from the sections to a programmable controller mounted to the chair;
   (d) determining durations that the characteristics are sensed for each of the sections, via the controller;
   (e) comparing the durations with threshold values for each section, via the controller;
   (f) energizing at least one actuator to automatically tilt the seat bottom section if the comparison for the seat bottom section exceeds a first desired value; and
   (g) energizing the at least one actuator to automatically tilt at least one of: (i) the thoracic section or (ii) the pelvic section, if the comparison for the thoracic or the pelvic section exceeds a second desired value;
   (h) wherein each of the thoracic and pelvic sections comprises a slat pivotally supported for movement about a laterally extending horizontal axis at a middle of a vertical direction of each of the slats.

19. The method of claim 18, wherein the chair is a wheelchair comprising:
   a lower frame to which the seat bottom section is coupled;
   rotating floor-contacting wheels coupled to the lower frame;
   a back frame to which the thoracic section and the pelvic section are coupled; and
   energizing an electromagnetic actuator to tilt the back frame relative to the lower frame.

20. The method of claim 19, further comprising a battery and an electric driving motor rotating the wheels, and tilting the thoracic section independently of the pelvic section.

21. The method of claim 18, wherein the controller automatically controls at least the following motions based on the sensed characteristic signals:
   (a) causing the thoracic section to be in a neutral untilted orientation;
   (b) causing the thoracic section to be in a tilted and positively angled orientation; and
   (c) causing the thoracic section to be in a tilted and negatively angled orientation.

22. The method of claim 21, wherein the controller automatically controls at least the following motions based on the sensed characteristic signals:
   (a) causing the pelvic section to be in a neutral untilted orientation, due to the controller energizing a first electromagnetic actuator of the at least one actuator;
   (b) causing the pelvic section to be in a tilted and positively angled orientation, due to the controller energizing the first electromagnetic actuator;
   (c) causing the pelvic section to be in a tilted and negatively angled orientation, due to the controller energizing the first electromagnetic actuator;
   (d) causing the seat bottom section to be in a neutral untilted orientation, due to the controller energizing a second electromagnetic actuator of the at least one actuator; and
   (e) causing the seat bottom to be in a tilted angled orientation, due to the controller energizing the second electromagnetic actuator.

23. The method of claim 18, wherein the controller automatically controls at least the following motions based on the sensed characteristic signals:
   (a) causing the pelvic section to be in a neutral untilted orientation;
   (b) causing the pelvic section to be in tilted and positively angled orientation; and
   (c) causing the pelvic section to be in a tilted and negatively angled orientation.

24. The method of claim 18, wherein the controller automatically controls at least the following motions based on the sensed characteristic signals:
   (a) causing the seat bottom section to be in a neutral untilted orientation;
   (b) causing the seat bottom section to be in a first tilted orientation; and
   (c) causing the seat bottom section to be in a second tilted orientation different than the neutral and first tilted orientations.

25. The method of claim 18, wherein the controller automatically energizes the at least one actuator to:
   (a) tilt an upper edge of the thoracic section forwardly of a substantially vertical plane of the seat back frame; and
   (b) tilt a lower edge of the pelvic section forwardly of the substantially vertical plane of the seat back frame.

26. The method of claim 18, wherein the controller automatically energizes the at least one actuator to:
   (a) tilt a lower edge of the thoracic section forwardly of a substantially vertical plane of the seat back frame; and
   (b) tilt an upper edge of the pelvic section forwardly of the substantially vertical plane of the seat back frame.

27. The method of claim 18, wherein the controller automatically:
   (a) causes the pelvic section to be in an intermediate tilted orientation between +/−5-15°, due to the controller energizing at least one actuator;
   (b) causes the pelvic section to be in a fully tilted orientation of at least +/−15°, due to the controller energizing the at least one of actuator;
   (c) causes the thoracic section to be in an intermediate tilted orientation between +/−5-15°, due to the controller energizing the at least one of actuator;
   (d) causes the thoracic section to be in a fully tilted orientation of at least +/−15°, due to the controller energizing the at least one of actuator;
   (e) causes the seat bottom to be in an intermediate tilted orientation between +/−5-15° about a substantially horizontal pivot axis, due to the controller energizing the at least one actuator;
   (f) causes the seat bottom to be in a fully tilted orientation of at least +/−15° about the pivot axis, due to the controller energizing the at least one actuator; and
   (g) automatically varying the orientations of the sections based upon both of: (i) the sensed characteristic signals, and (ii) the comparisons of the durations.

28. The method of claim 18, further comprising placing a film sensor, which performs the sensing of the user characteristic, between a cushion and a cover for each of the sections, the cushion being mounted upon a rigid support coupled to the at least one actuator, and the film sensor having a width of at least 50 mm, a length of at least 50 mm and a thickness of less than 5 mm.

29. The method of claim 18, further comprising:
(a) supplying AC power to an electrical circuit connected to electromagnetic actuators;
(b) bending a lattice of substantially vertical and substantially horizontal back supports located at the thoracic and pelvic sections; and
(c) moving a lower frame and a back frame relative to a floor-contacting and substantially stationary base located below the seat bottom.

30. The method of claim 18, wherein the chair is an upholstered, reclining chair comprising flexible, laterally spaced apart, and substantially upright elongated posts, the method further comprising a transmission coupled to the at least one actuator tilting the seat bottom between a neutral position, a rearwardly tilted intermediate orientation and a full tilted orientation in response to software instructions run by the programmable controller, the software instructions including reposturing interlude and an automatic movement notification functions.

* * * * *